Dec. 18, 1928.  
H. ARMSTRONG  
1,696,072  
BRAKE FOR CONVEYERS  
Filed Jan. 31, 1927  
2 Sheets-Sheet 1
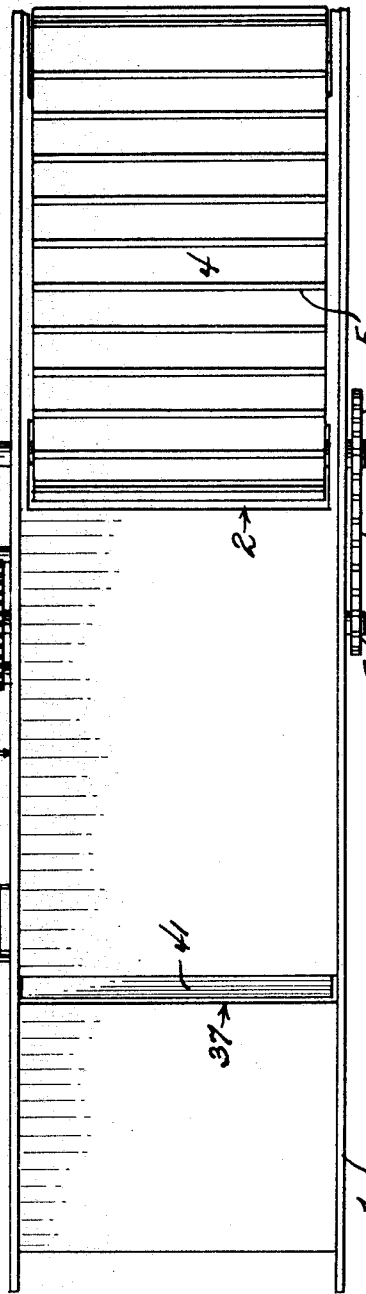
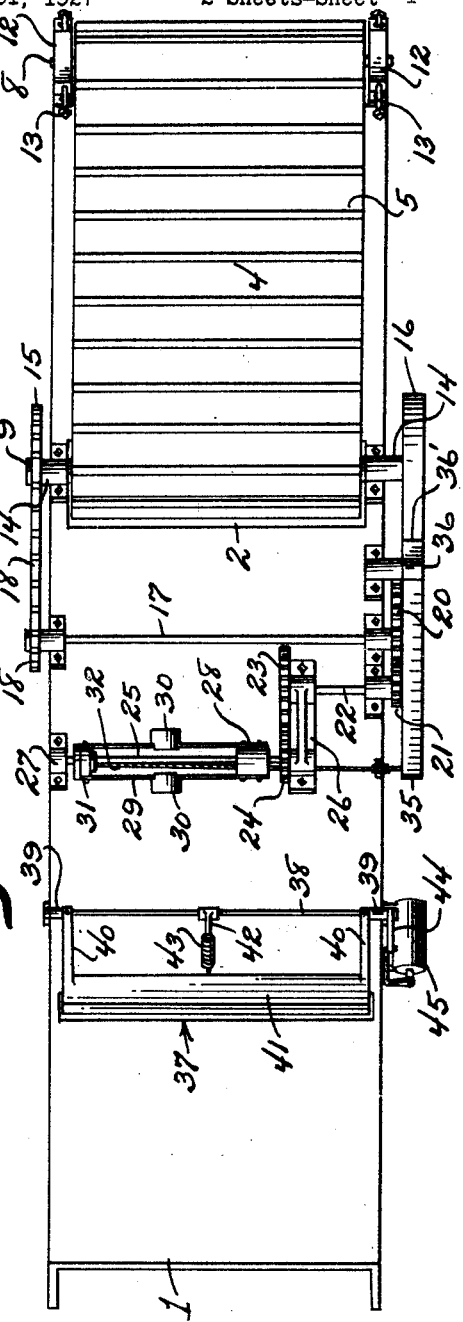
Howard Armstrong  
INVENTOR  
BY Victor J. Evans  
ATTORNEY
WITNESS:

Dec. 18, 1928.

H. ARMSTRONG 1,696,072

BRAKE FOR CONVEYERS

Filed Jan. 31, 1927    2 Sheets-Sheet 2

Howard Armstrong
INVENTOR

BY Victor J. Evans
ATTORNEY

WITNESS

Patented Dec. 18, 1928.

1,696,072

UNITED STATES PATENT OFFICE.

HOWARD ARMSTRONG, OF HUMBERSTONE, ONTARIO, CANADA.

BRAKE FOR CONVEYERS.

Application filed January 31, 1927. Serial No. 164,937.

My present invention has reference to a bag, sack or bundle delivering and counting machine, and one of my objects is to simplify and improve the construction of such devices upon which I filed, on Aug. 5, 1925, U. S. patent application Serial No. 48,327, the same having been allowed on June 11, 1926, and which has since merged into Patent No. 1,613,552.

Another object is the provision of a means for this purpose whereby bags of material or the like are directed through a chute onto a loading device in a manner whereby the said bags are prevented from crowding each other, wherein each bag is singly delivered through the chute and is accurately counted.

To the attainment of the above broadly stated objects and many others which will present themselves as the nature of the invention is better understood, the improvement also resides in certain other novel features of construction, combination and operative association of parts, one satisfactory embodiment of which is disclosed by the accompanying drawings.

In the drawings:

Figure 1 is a top plan view of my improvement.

Figure 2 is a bottom plan view thereof.

Figure 3 is a central longitudinal section therethrough.

Figure 4 is a section on the line 4—4 of Fig. 3.

Referring now to the drawings in detail, the numeral 1 designates a chute which is arranged at an angle so that filled bags or sacks and other articles will gravitate therethrough and be directed into a wagon, car or other conveyance. The bottom of the chute, at a suitable distance from its lower outlet end, is formed with transverse openings, 2 and 3 and through these openings there is designed for travel the upper lead of an endless conveyer 4. The conveyer has its outer face provided with spaced transverse slots or flights 5. The conveyer travels on rollers whose upper portions are received through the mentioned openings, 2 and 3, the said rollers being indicated by the numerals 6 and 7, respectively, and the shafts or trunnions therefor by the numerals 8 and 9, respectively. The trunnions 8 for the inner roller 6 revolve in a bearing 10 that is in the nature of a substantially rectangular block and each of these blocks is received in a central rectangular opening 11 in members 12 which are secured to and depend from the bottom of the chute 1. Passing through threaded openings in the ends of the bearing supporting members 12 there are adjustable elements 13, preferably in the nature of bolts, and these bolts contacting with the opposite ends of the bearing block 10, permit of the longitudinal adjustment thereof, so that any slack in the conveyer can be thus compensated for.

The bearings 14 for the roller 7 are also secured to the under face of the chute 1, but are arranged closer to the bottom thereof than the bearing 10 so that the delivery end of the conveyer is elevated. This is an important feature of the invention inasmuch as the sacks or bundles gravitating in the chute 1 and riding onto the endless conveyer 4 will be partially retarded in their movement when on said conveyer, although the sacks or bundles impart motion to the conveyer.

On one of the trunnions 9 for the roller 7 there is fixed a sprocket wheel 15 and on the second trunnion 9 there is fixed a fly wheel 16.

The numeral 17 designates a shaft which is journaled in suitable bearings on the bottom of the chute. On one end of this shaft there is a sprocket wheel 18 which is arranged opposite the sprocket wheel 15 and threaded around these sprocket wheels there is a sprocket chain 18'. On the opposite end of the shaft 17 there is fixed a toothed wheel 20 which is in mesh with a pinion 21 on a short shaft 22 that is journaled in suitable bearings on the under face of the chute. On its inner end the shaft 22 has fixed thereon a gear 23 which is in mesh with a similar pinion 24 on a shaft 25 that has one end journaled on the inner bearing 26 for the shaft 22, and its opposite end journaled in a bearing 27. On the shaft 25 there is a governor of the weight influenced spring arm type. The governor includes a head 28 which is fixed on the shaft 25, spring arms 29 extending from the opposite sides of the said head and there is a weight 30 on each of the arms. The outer ends of the arms are connected to disc heads 31 that are freely mounted and, therefore, slidable on the shaft 25. To one of the heads 31 there is fixed a flexible element 32 and this element is guided over suitable sheave wheels 33 and 34 and is connected to one end of an arm 35 which is pivoted, as at 36, to a suitable support on one side of the chute at the bottom thereof. The arm 35 is integrally formed with an angularly disposed brake shoe 36' whose concaved face rests against the fly wheel 16. Except the upper lead of the conveyer, none of the above mentioned mechanism is arranged in the chute, and in the main the same is positioned on the bottom of said chute.

As far as the description has progressed it will be apparent that the loaded sack or package delivered with great momentum on the conveyer to cause the latter to move beyond a predetermined rate of speed will, through the medium of the mechanism just described, rapidly revolve shaft 25, causing the spring and weighted arms of the governor to move outwardly in opposite directions from said shaft and, thereby draw upon the flexible element 32 to pull upon the arm or tail portion 35 of the brake 36', moving the said arm 35 upwardly with respect to the chute and causing the brake to frictionally engage with the fly or brake wheel 16, thereby retarding the rapid movement of the conveyer. By such arrangement it will be seen that each article will be delivered by the conveyer to the outlet end of the chute at the same rate of speed, it being, of course, understood that the bags or like articles are of the same weight.

The chute at a suitable distance from its outlet opening has a transverse opening 37 therethrough. Journaled on the shaft 38 mounted in bearings 39 on the bottom of the chute there are arms 40 on the ends of a contact block or shutter 41. The inner edge of the shutter is beveled, as clearly disclosed by Figure 4 of the drawings, and fixed on the shaft 38 there is an angle arm. Fixed on the arm 42 and connected to the bottom of the chute there is a spring 43. The spring influences the angle arm 42, and consequently the arms 40, over the block or shutter toward the under face of the chute and brings the angle face of the said block or shutter through the opening 37 in the chute. Also on the shaft there is fixed another crank arm 44 that has a link connection with a disc counter 45 of the usual construction, the said counter being fixed on one side of the chute. With this arrangement it will be seen that the bags, riding over the block 41, will swing the same downwardly and will actuate the disc counter 45 so that each bag will be accurately numbered in its passage through the chute. It may happen that the bags will ride on each other, as disclosed by the dotted and full lines in Figure 3 of the drawings, but as the rear portions of these bags rest on the bottom of the chute they cannot fail to contact with the block 41 and, therefore, be properly numbered in their passage through the chute.

It is believed that the simplicity of my construction and the advantages thereof will be fully apparent to those skilled in the art to which such invention relates when the foregoing has been carefully read in connection with the accompanying drawings and that further detailed description will not be required. Obviously I do not wish to be restricted to the precise details herein set forth and, therefore hold myself entitled to such changes and modifications therefrom as fairly fall within the scope of what I claim.

Having described the invention, I claim—

1. In a device for the purpose set forth, the combination with a chute having an endless conveyer therein and a fly wheel for the conveyer; of a brake for the conveyer comprising a shaft rotated by the movement of the conveyer, a weighted expansible governor on the shaft, a cable associated therewith, a pivoted brake shoe opposite the fly wheel connected with the cable and influenced into frictional engagement with the fly wheel when the cable is drawn taut by the expansion of the governor.

2. In a device for the purpose set forth, the combination with a chute having an endless conveyer therein and a fly wheel on one end of the conveyer; of means for controlling the speed of movement of the conveyer, said means comprising a shaft rotated by the movement of the conveyer, a governor for said shaft including a fixed head, spring weighted arms secured on the head, discs on the outer ends of the arms slidable on the shaft, a cable secured on one of said discs, guide means for the cable, and a pivotally supported brake shoe having a tail end to which the cable is connected, and said shoe designed to be swung into frictional engagement with the fly wheel, upon the expansion of the governor.

In testimony whereof I affix my signature.

HOWARD ARMSTRONG.